US010919571B2

(12) United States Patent
Bertassi et al.

(10) Patent No.: US 10,919,571 B2
(45) Date of Patent: Feb. 16, 2021

(54) INDEPENDENT SUSPENSION FOR VEHICLES, IN PARTICULAR A SUSPENSION FOR A DIRECTIONAL WHEEL FOR VEHICLES

(71) Applicant: Brist Axle Systems S.R.L., Montichiari (IT)

(72) Inventors: Matteo Bertassi, Montichiari (IT); Danilo Bonera, Collebeato (IT)

(73) Assignee: BRIST AXLE SYSTEMS S.R.L., Montichiari (IT)

( * ) Notice: Subject to any disclaimer, the term of this patent is extended or adjusted under 35 U.S.C. 154(b) by 103 days.

(21) Appl. No.: 16/300,250

(22) PCT Filed: May 16, 2017

(86) PCT No.: PCT/IB2017/052872
§ 371 (c)(1),
(2) Date: Nov. 9, 2018

(87) PCT Pub. No.: WO2017/199166
PCT Pub. Date: Nov. 23, 2017

(65) Prior Publication Data
US 2019/0144034 A1    May 16, 2019

(30) Foreign Application Priority Data

May 18, 2016    (IT) .................. 102016000050950

(51) Int. Cl.
*B62D 7/18*    (2006.01)
*B60G 3/20*    (2006.01)
*B60G 11/27*    (2006.01)

(52) U.S. Cl.
CPC .............. *B62D 7/18* (2013.01); *B60G 3/20* (2013.01); *B60G 11/27* (2013.01);
(Continued)

(58) Field of Classification Search
CPC ...................................................... B62D 7/18
See application file for complete search history.

(56) References Cited

U.S. PATENT DOCUMENTS

| | | | | |
|---|---|---|---|---|
| 4,951,959 A | * | 8/1990 | Watanabe | B60G 3/26 280/124.136 |
| 5,048,859 A | * | 9/1991 | Nishikuma | B60G 3/20 180/253 |

(Continued)

FOREIGN PATENT DOCUMENTS

| | | |
|---|---|---|
| CN | 101678730 A | 3/2010 |
| CN | 203093660 U | 7/2013 |

(Continued)

OTHER PUBLICATIONS

International Search Report and Written Opinion dated Nov. 14, 2017 for counterpart PCT Application No. PCT/IB2017/052872.

(Continued)

*Primary Examiner* — James A English
(74) *Attorney, Agent, or Firm* — Shuttleworth & Ingersoll, PLC; Timothy J. Klima

(57) ABSTRACT

An independent suspension for vehicles, in particular for heavy vehicles, includes a steering knuckle developing between an outer portion, defining the axis of rotation of a wheel hub, and an inner portion, having a receiving seat extending transversely to the outer portion along a steering axis and a knuckle-carrier assembly rotatably coupled to the inner portion of the knuckle to allow a relative rotation around the steering axis, and including at least a first and a second supporting portion defining each a substantially horizontal hinge point for one end of a respective cross arm. The knuckle-carrier assembly includes a first and a second body, separate to each other, in which the first body includes a steering pin developing along the steering axis and the first
(Continued)

supporting portion, and the second body is partially fitted around the steering pin and includes the second supporting portion.

14 Claims, 5 Drawing Sheets

(52) U.S. Cl.
CPC .... *B60G 2200/144* (2013.01); *B60G 2200/17* (2013.01); *B60G 2200/44* (2013.01); *B60G 2204/148* (2013.01); *B60G 2204/1484* (2013.01); *B60G 2206/50* (2013.01); *B60Y 2200/143* (2013.01)

(56) References Cited

U.S. PATENT DOCUMENTS

| | | | | |
|---|---|---|---|---|
| 5,228,717 A * | 7/1993 | Perkins | ................ | B60G 13/006 |
| | | | | 280/124.143 |
| 8,453,774 B2 * | 6/2013 | Nagaya | .................... | B60G 3/01 |
| | | | | 180/65.51 |
| 8,573,615 B2 * | 11/2013 | Kuwabara | ................ | B60G 3/06 |
| | | | | 180/253 |
| 8,967,318 B2 * | 3/2015 | Kuwabara | ................ | B60G 3/14 |
| | | | | 180/291 |
| 9,463,677 B2 * | 10/2016 | Czerr | ........................ | B60G 3/20 |
| 2003/0234504 A1 * | 12/2003 | Frantzen | ................ | B60G 15/07 |
| | | | | 280/93.512 |
| 2013/0307243 A1 * | 11/2013 | Ham | ........................ | B60G 3/06 |
| | | | | 280/124.134 |
| 2016/0318363 A1 * | 11/2016 | Bonera | .................... | B60G 3/20 |

FOREIGN PATENT DOCUMENTS

| | | |
|---|---|---|
| DE | 102013222443 A1 | 5/2015 |
| EP | 2147809 A1 | 1/2010 |
| FR | 1173058 A | 2/1959 |
| FR | 1232152 A | 10/1960 |
| GB | 485267 A | 5/1938 |

OTHER PUBLICATIONS

Chinese Office Action dated Oct. 12, 2020 from counterpart Chinese App No. 201780030274.7.

* cited by examiner

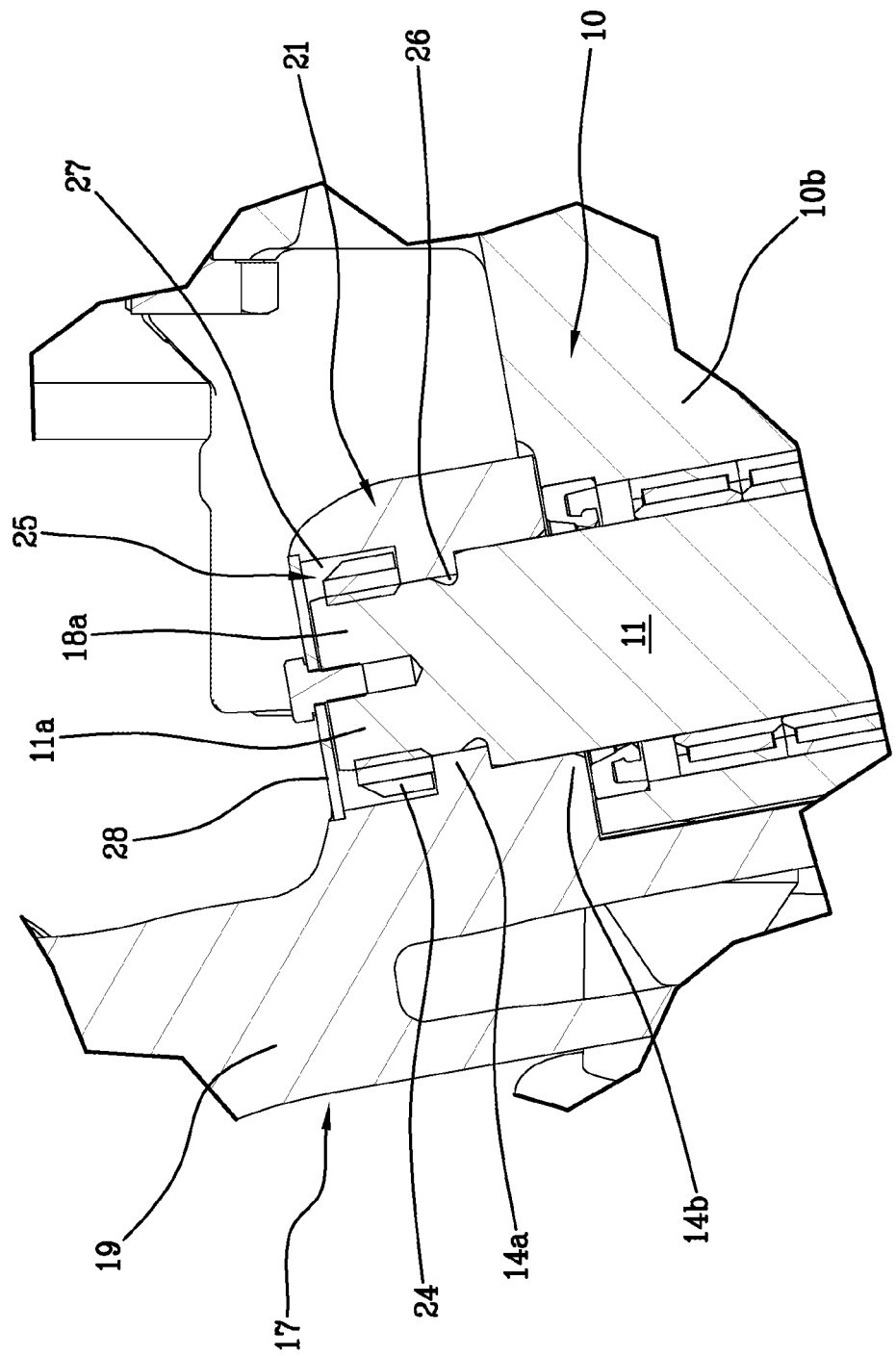

INDEPENDENT SUSPENSION FOR VEHICLES, IN PARTICULAR A SUSPENSION FOR A DIRECTIONAL WHEEL FOR VEHICLES

This application is the National Phase of International Application PCT/IB2017/052872 filed May 16, 2017 which designated the U.S.

This application claims priority to Italian Patent Application No. 102016000050950 filed May 18, 2016, which application is incorporated by reference herein.

The present invention relates to an independent suspension for vehicles, in particular a suspension for a directional wheel for vehicles, preferably, but not exclusively, of the passenger transport type such as buses, omnibus, minibus or the like.

The present invention is therefore applicable in the automotive field, particularly in the construction of steering axles.

In the known art, independent suspensions have been knowing for a long time, i.e. they are structured to allow each wheel of the same axis to move vertically (i.e. reacting to a collision on the road) independently of the other.

In the heavy vehicle segment, three independent suspension solutions are known, namely:
  knuckle-carrier;
  spherical joints;
  "T" joints.

The "classical" solution, with knuckle-carrier, is intended to connect the upper and lower cross arms to the knuckle (which carries the wheel hub) through a knuckle-carrier body provided with two end portions, an upper one and a lower one, pivoted by means of horizontal hinges with the outer ends of the suspension "arms" and a median portion, protruding outside the ends, with respect to the vehicle, and pivoted to the knuckle by means of a pin defining the steering axis.

In the most well-known embodiments, the knuckle has a fork shape and the intermediate portion of the assembly is inserted between the two arms of the fork and pivotally fitted on the pin, which, in turn, is engaged by interference in the arms themselves.

Disadvantageously, such solution, despite being efficient and robust, implies the need to create a knuckle-carrier body of considerable size and weight, which results in increased cost to the manufacturer and increased stress on all components and bearings of the suspension.

The other two known solutions, which use spherical or "T" joints, brilliantly solve the problem of weights and dimensions, effectively eliminating the presence of different components, but, in turns, they introduce problems, which are highly perceived by vehicle manufacturers.

In fact, the solution with spherical joints implies the origin of strong frictions at the joints, which results in a considerable reduction of the useful life of the suspension.

Moreover, the joining of the two pairs (arms and steering) of rotation axes in only two spherical joints (or even "T" joints) needs to be positioned at the ends of the cross arms, or in a much more internal area of the vehicle with respect to the knuckle.

This feature, which is required by the configuration without a steering pin, is negatively reflected on the "cross ground arm", i.e. on the distance between the ground projection of the steering axis and the central part of the contact area of the tire, a parameter which is often critical in determining the driving comfort or the steering response.

The aim of the present invention is therefore to make available an independent suspension for vehicles, in particular heavy vehicles, able to overcome the drawbacks related to the above-mentioned know art.

In particular, it is an object of the present invention to provide an independent suspension for vehicles, in particular for heavy vehicles, having a light structure which also allows to obtain limited ground arm values.

In addition, it is an object of the present invention to make available an independent suspension for vehicles, in particular for heavy vehicles, which is cheap and easy to assemble and maintain.

Again, it is an object of the present invention to make available an independent suspension for vehicles, in particular for heavy vehicles, which is cheap and easy to manufacture.

Said objects are achieved by an independent suspension for vehicles, in particular for heavy vehicles, having the characteristics as disclosed herein, and in particular comprising a steering knuckle developing between an outer portion, defining the axis of rotation of a wheel hub of said vehicle, and an inner portion, wherein the inner portion comprises at least one receiving seat extending transversely to said outer portion along a steering axis and a knuckle-carrier assembly rotatably coupled to said inner portion of the knuckle to allow a relative rotation around the steering axis; said knuckle-carrier assembly comprising at least a first and a second supporting portion defining each a substantially horizontal hinge point for one end of a respective cross arm.

According to an aspect of the present invention, the knuckle-carrier assembly comprises a first and a second body, separate to each other, wherein the first body comprises a steering pin developing along said steering axis and said first supporting portion of the knuckle-carrier assembly, and the second body is partially fitted around said steering pin and comprises said second supporting portion of the knuckle-carrier assembly.

More specifically, the first body is essentially "L" shaped and has a linear portion, defining a steering pin and an angled portion defining said first supporting portion and extending transversely to the linear portion to misalign the respective hinge point from said steering axis, and the second body comprises a coupling portion fitted around the steering pin from which a supporting arm protrudes comprising the second supporting portion and extending laterally to the linear portion of the first body to misalign the respective hinge point from said steering axis.

Advantageously, in this way, the steering pin contributes to the stiffening of the structure, but, at the same time, the presence of two misaligned supporting portions with respect to the steering axis allows the steering pin to be positioned more externally, i.e. more internally with respect to the wheel, with great benefit for the compactness of the structure and the cross ground arm.

Moreover, the possibility to disassemble the knuckle-carrier assembly makes the suspension easy to assemble, maintain and manufacture, greatly simplifying the mould making.

According to a further (and possibly complementary) aspect of the present invention, the knuckle-carrier assembly (also in a monolithic configuration) comprises a coupling portion fitted around the steering pin and comprising at least two constraint bodies aligned and spaced along said steering axis and provided with respective seats, coaxial to each other, to accommodate said pin.

Advantageously, in this way, the support body (especially in the embodiments in which it is the upper one) discharges the chassis and spring loads onto the knuckle in at least two points, allowing to manufacture a much lighter structure with same performances.

These and other features, with their advantages, will become anyway more apparent from the below exemplary, therefore not limiting, description, of a preferred, therefore not exclusive, embodiment of an independent suspension for vehicles, in particular for heavy vehicles as shown in the attached Figures, wherein:

FIG. 2a shows a detail of FIG. 2;

Figure 1:
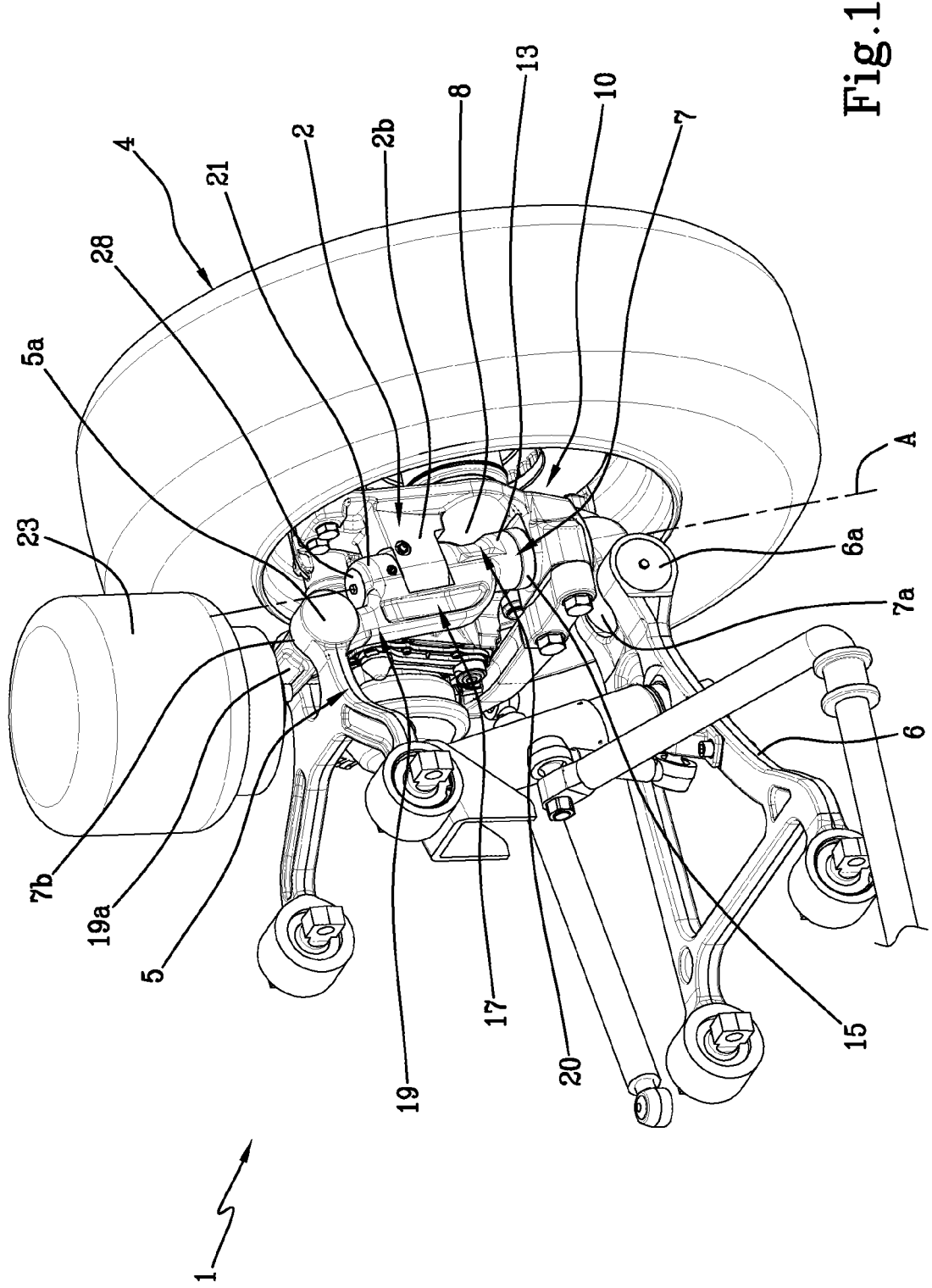
FIG. 1 shows a perspective view of an independent suspension for vehicles.
Figure 2:
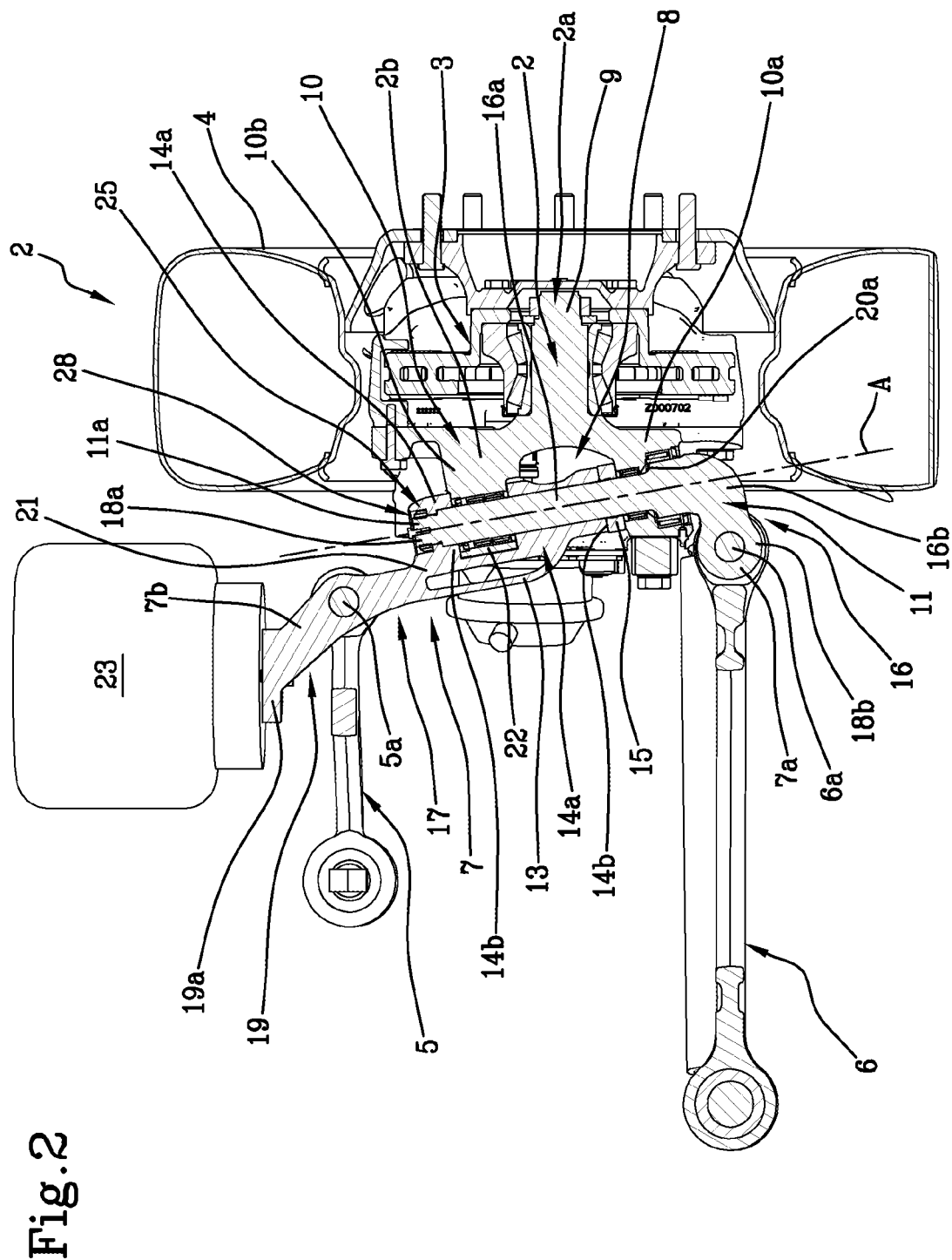
FIG. 2 shows a cross-sectional view of the suspension of FIG. 1 performed along the incidence axis (or caster)
Figure 3:
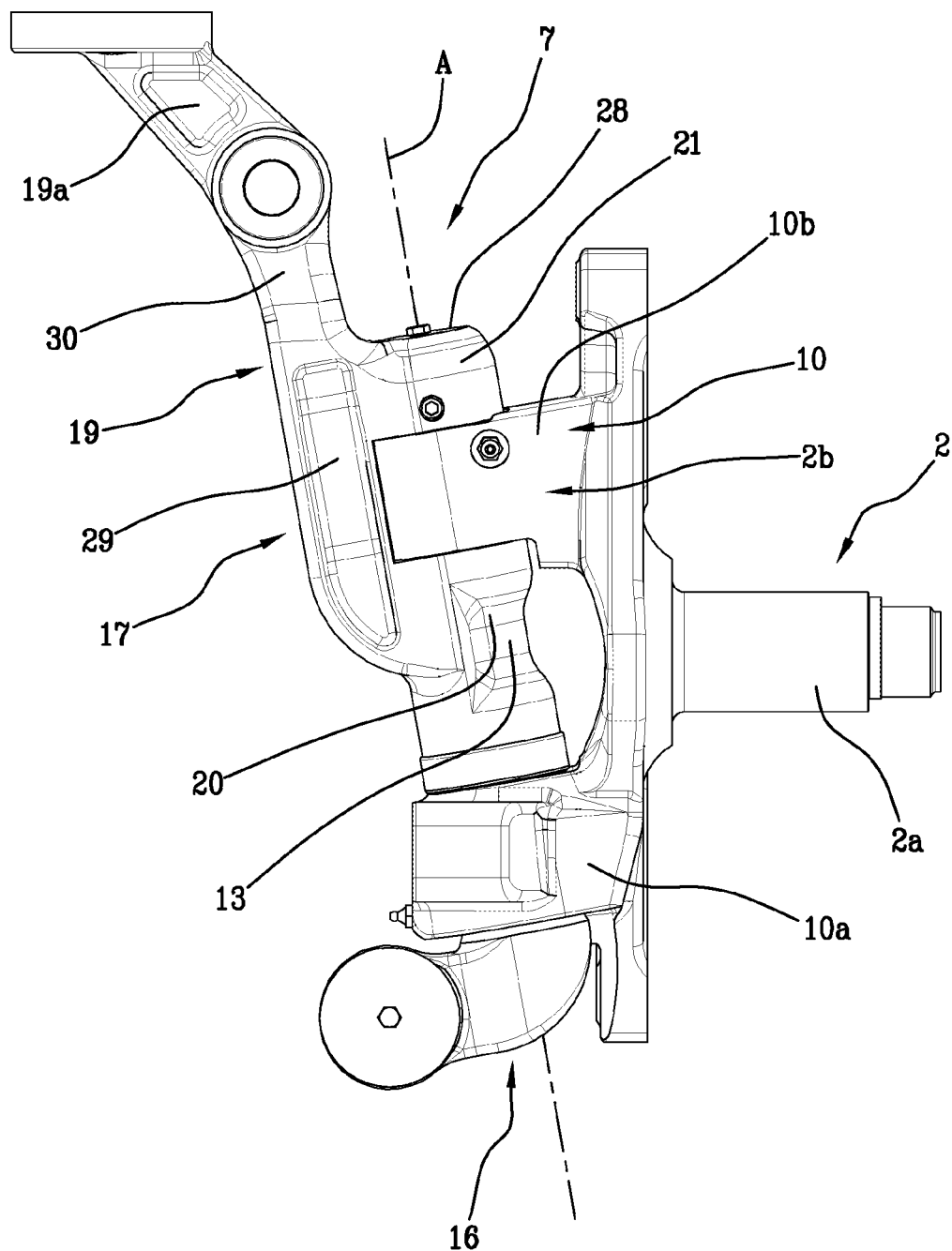
FIG. 3 shows a front view of the group knuckle/knuckle-carrier assembly of the suspension of FIG. 1.
Figure 4:
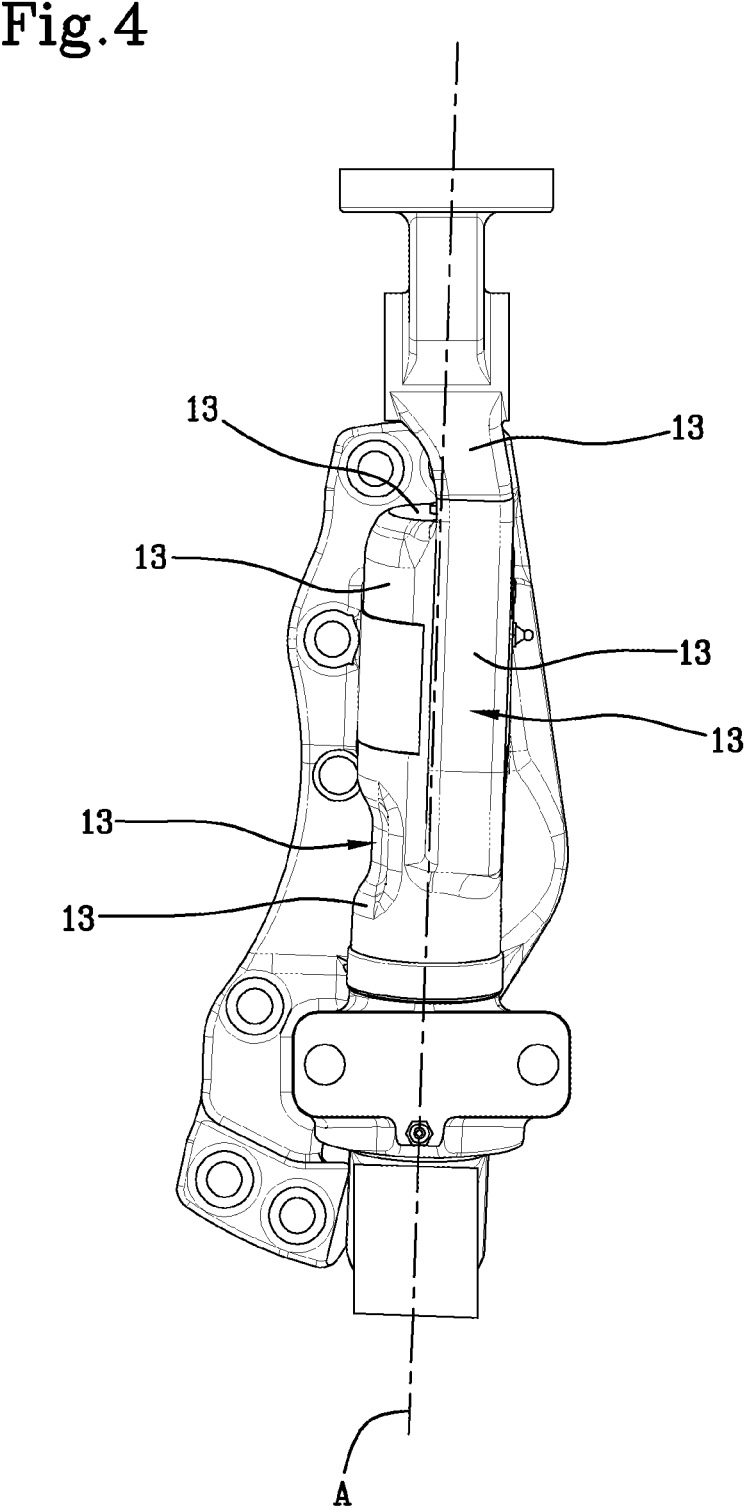
FIG. 4 shows a side view of a detail of FIG. 3.

With reference to the appended figures, number 1 indicates an independent suspension for vehicles according to the present invention.

As already mentioned, the term independent suspension aims to define an assembly structured to allow each wheel of the same axis to move vertically (i.e. reacting to a collision on the road) independently of the other.

Preferably, the suspension 1 is a suspension for a directional wheel, more preferably a front wheel of a vehicle.

The suspension mainly comprises a steering knuckle 2 (provided with a pin), on which, during use, the hub 3 of a wheel 4 is rotatably constrained, a pair of cross arms, an upper one 5 and a lower one 6, and a knuckle-carrier assembly 7 pivoted to the arms by means of special (horizontal) hinge points 5a, 6a and rotatably associated to the knuckle 2 to allow the rotation around a steering axis "A".

The steering knuckle 2 extends between an outer portion 2a, defining the axis of rotation of the hub 3, and an inner portion 2b.

Note that the terms "internal", "external", "upper" and "lower" in this text refer to an operating condition of the suspension 1, i.e. mounted on the vehicle.

The inner portion 2b of the knuckle 2 comprises at least one receiving seat 8 extending transversely to said outer portion along said steering axis "A".

Preferably, the steering axis "A" is transverse to the axis of rotation of the hub 3, more preferably inclined with respect to it of an angle in the range between 60° and 90°, more preferably between 75° and 85°, in particular of about 80°.

Therefore, the outer portion 2a is preferably defined by a substantially horizontal shaft 9 extending away from the inner portion 2b.

This shaft 9 is rotatably associated, preferably by means of a pair of conical bearings, to the hub 3 of the wheel, which is therefore rotatable around an axis of rotation corresponding to the shaft.

In the preferred embodiment, the inner portion 2b of the steering knuckle 2 comprises a fork body 10 provided with two arms 10a, 10b facing to each other and spaced to define, between the arms, said receiving seat 8.

Therefore, the knuckle 2 has essentially a "Y" shape.

Preferably, the fork body 10 is also oriented so that the arms are a lower one 10a and an upper one 10b.

The knuckle-carrier assembly 7 is rotatably coupled to the inner portion 2b of the knuckle 2 to allow a rotation of the knuckle 2, with respect to it, around said steering axis "A", and comprises at least a first 7a and a second supporting portion 7b each provided with a hinge point 5a, 6a substantially horizontal to one (outer) end of a respective cross arm 5, 6.

Preferably, the hinge points 5a, 6a are defined by pins 5b, 6b rigidly constrained to the respective supporting portion 7a, 7b and rotatably coupled, by means of bearings or slides, with the respective cross arm 5, 6.

Preferably, the first supporting portion 7a is associated with the lower arm 6, while the second supporting portion 7b is associated with the upper arm 5.

The suspension further comprises a steering pin 11 extending along the steering axis "A" and constrained to the receiving seat 8 of the inner portion 2b of the knuckle.

The pin 11 is thus a bar developing between its two ends 11a along the steering axis "A".

The knuckle-carrier assembly 7 comprises a coupling portion 13 fitted around the steering pin 11.

According to an aspect of the present invention, the coupling portion 13 of the knuckle-carrier assembly 7 comprises at least two constraint bodies 14 aligned and spaced along said steering axis "A" and provided with respective seats 14a, coaxial to each other, to accommodate said pin 11.

More specifically, the inner portion 2b of the steering knuckle 2 is at least partially housed between the two constraint bodies 14 of the coupling portion 13 of the knuckle-carrier assembly 7.

Therefore, each constraint body 14 comprises at least one unloading surface 14b of the forces attested to the inner portion 2b of the steering knuckle 2.

Consequently, the coupling portion 13 of the knuckle-carrier assembly 7 has a "C" shape, wherein both constraint bodies 14 are resting on the knuckle 2.

Therefore, the coupling portion 13 of the knuckle-carrier assembly 7 and said fork body 10 are mutually penetrating, defining an alternate succession of supporting bodies 14a and arms 10a, 10b along the steering axis "A".

Advantageously, in this way, the forces transmitted from the knuckle-carrier assembly 7 to the knuckle 2 are discharged in two distinct and spaced points, allowing for an excellent bending resistance with a slender structure.

Therefore, this possibility allows to realize simple, compact and cheap components.

In this regard, note that there is provided at least a thrust bearing 15 interposed between at least one of said unloading surfaces 14b and the inner portion of the steering knuckle 2b.

According to a further aspect of the present invention (which is complementary to the preceding one), the pin 11 is integrated with the knuckle-carrier assembly 7.

Furthermore, the knuckle-carrier assembly 7 comprises a first 16 and a second body 17 distinct from one another.

The first body 16 comprises the steering pin 11 and the first supporting portion 7a of the knuckle-carrier assembly 7.

The second body 17 is partially fitted around the steering pin 11 and comprises the second supporting portion 7b of the knuckle-carrier assembly 7.

Advantageously, in this way, the knuckle-carrier assembly 7 is easy to assemble.

Moreover, its decomposable structure comprising both the steering pin 11 and the supporting portions 7a, 7b provides a compact and robust structure.

In some embodiments, the first body 16 is constrained to rotation with respect to the second body 17, preferably by means of mechanical members, such as grains or spines (defining anti-rotational constraint means).

Preferably, the first body 16 is substantially "L" shaped and has a linear portion 16a and an angled portion 16b.

The linear portion 16a defines the steering pin 11.

The angled portion 16b defines the first supporting portion 7a and extends transversely to the linear portion 16a to misalign the respective hinge point 6a from said steering axis "A".

Preferably, the linear portion 16a (i.e. the steering pin 11) is housed internally to the receiving seat 8 of the inner portion 2b of the knuckle, whereas the angled portion 16b (or the first supporting portion 7a) is arranged externally, preferably downstream to the receiving seat 8.

In other words, the linear portion 16a of the first body 16 is rotatably coupled to the arms 10a, 10b of the fork body 10 of the knuckle 2, whereas the angled portion 16b protrudes externally to one of them, in particular inferior to the lower arm 10a.

Therefore, the knuckle 2 comprises at least one pair (preferably two pairs, one for each arm) of radial bearings housed in the arms 10a, 10b and rotatably coupled with the pin 11.

More precisely, furthermore, the steering pin 11, or a free end of the linear portion 16a, protrudes externally to said receiving seat 8, on the opposite side with respect to the first supporting portion 7a.

In other words, the first body 16 develops through the fork body 10, between a first terminal portion 18a protruding above the upper arm 10b (and defining said free end) and a second terminal portion 18b protruding below the lower arm 10a (and defining the angled portion 16b).

Note that the first terminal portion 18a corresponds to the end 11a of the pin 11.

The second body 17 of the knuckle-carrier assembly 7 comprises the above-mentioned coupling portion 13.

This coupling portion 13 is fitted around the steering pin 11 and from which a supporting arm 19 protrudes away from the first supporting portion 7a of the first body 16.

The supporting arm 19 comprises the second supporting portion 7b.

Preferably, the supporting arm 19 develops laterally to the coupling portion 13, partly flanked to it.

More specifically, the supporting arm 19 has a proximal portion 29 with respect to the coupling portion flanked to it and substantially parallel to it and a distal portion 30 from the coupling portion defining an extension of the proximal portion and includes said hinge point 5a.

In the preferred embodiment, the supporting arm 19 is offset from the coupling portion 13 with respect to the plane joining the steering axes of the two front wheels of the vehicle.

In other words, a plane joining the supporting arm 19 and the coupling portion 13 is inclined and incident with respect to the plane passing through the two steering axes of the two front wheels of the vehicle.

Accordingly, with reference to the vehicle, the supporting arm 19 is arranged rearwards with respect to the coupling portion 13.

Moreover, in the preferred embodiment, the supporting arm 19 protrudes above the coupling portion 13 and the steering knuckle 2.

More preferably, the supporting arm 19 has a protrusion 19a terminating with a supporting plate for a spring or damper 23.

Preferably, the protrusion 19a develops beyond the hinge point 5a.

Thus, the supporting arm 19 develops between a first end, constrained to the coupling portion 13, an intermediate portion rotatably coupled to the upper arm 5 through the respective hinge point 5a, and a second (upper) end carrying the spring or damper 23.

Therefore, the protrusion 19a develops between the intermediate portion and the second end.

Note that, in alternative embodiments (not shown), the protrusion may develop between the coupling portion 13 and the hinge point 5a.

Preferably, the suspension 1 comprises at least one thrust bearing 15 (already briefly described above) operatively interposed between the second body 17 of the knuckle-carrier assembly 7 and the inner portion 2b of the knuckle 2 at a bearing or unloading area.

In particular, the coupling portion 13 of the second body 17 of the knuckle-carrier assembly 7 comprises at least one sleeve 20 fitted around said steering pin 11 (i.e. around the linear portion 16a) and housed in the receiving seat 8 of the knuckle 2.

The sleeve 20 thus defines a constraint body 14 as described above.

Such sleeve 20 is interposed between the two arms 10a, 10b of the fork body 10 and has a lower end 20a resting on the lower arm 10a.

The lower end 20a of the sleeve 20 therefore defines an unloading surface 14b of the constraint body 14 attested to the knuckle to transmit forces and stresses.

The thrust bearing 15 is then placed around the steering pin 11 and interposed between the lower end 20a of the sleeve 20 and the lower arm 10b of the fork body 10.

Preferably, the second body 17 of the knuckle-carrier assembly 7 (in particular the coupling portion 13) comprises at least an auxiliary support 21 fitted around the steering pin 11 at its end portion opposite to the first supporting portion 7a of the first body 7.

More specifically, the auxiliary support 21 is fitted around the free end of the linear portion 16a of the first body 16, projecting above the upper arm 10b.

Preferably, the auxiliary support 21 is substantially an annular body.

The auxiliary support 21 thus defines the second constraint body 14 of the coupling portion 13 of the knuckle-carrier assembly 7.

Note that the auxiliary support 21 is coaxial and spaced from the sleeve 20 to define a housing 22; at least one arm 10a, 10b of the fork body 10 is located in said housing 22, preferably the upper arm 10b.

Thus, the steering pin 11 is placed through the sleeve 20 of the upper arm 10b (or the lower arm in other embodiments) and of the auxiliary support 21.

In the preferred embodiment, therefore, the inner portion 2b of the knuckle 2 and the second body 17 of the knuckle-carrier assembly 7 are, at least partly, "C" shaped opposite and mutually interpenetrating elements.

More specifically, the fork body 10 and the coupling portion 13 define the "C" shaped elements.

The first body 16 of the knuckle-carrier assembly 7 (in particular the pin 11) is inserted inside such "C" shaped elements, through thereof, with their end portions 18a, 18b protruding above and below.

In order to obtain an axial locking between the two bodies 16, 17 of the knuckle-carrier assembly 7 (and of the knuckle 2 itself), it is provided a clamping nut 24 coupled to the end portion of the steering pin 11 opposite to the first supporting portion 7a.

More precisely, the clamping nut 24 is coupled to the first terminal portion 18a of the first body 16.

In the shown embodiment, the clamping nut 24 is operably active between said terminal portion 18a and the auxiliary support 21.

Therefore, the clamping nut 24 is screwed to the first terminal portion 18a of the first body 16 (i.e., to the end portion of the pin 11), abutting on the auxiliary support 21.

In the preferred embodiment, it is provided a washer between said nut 24 and the auxiliary support 21, which is constrained to rotation to the pin 11, in order to prevent that a rotation of this latter causes the nut 24 to be loosened.

Preferably, said auxiliary support 21 of the second body 17 or said upper arm 10b of the fork 10 have a housing slot 25 for the end portion of the steering pin 11 and for the clamping nut 24.

Advantageously, in this way, the nut does not protrude and is not subject to any possible sliding or contact with other movable parts of the suspension (e.g., in the condition of maximum compression) which could compromise its clamping, or which may loosen it.

More specifically, in the illustrated embodiment, the auxiliary support 21 of the second body 17 is provided with said housing seat 25 for the clamping nut 24.

In detail, the housing seat 25 comprises a through hole having a narrow portion 26 facing the steering knuckle 2 to receive the pin 11 and an enlarged portion 27 facing away from the knuckle 2 and sized to receive and accommodate both the end portion of the steering pin 11 and the clamping nut 24.

Preferably, for a purely protective purpose, it is also provided an occluding cap 28 of the seat 25, which is constrained to the auxiliary support 21 and/or to the steering pin 11.

In the shown embodiment, the occluding cap 28 is defined by a disc attested at the edges of the hole at the enlarged portion 27 and constrained by means of tightening means (screw) to the steering pin 11.

The invention achieves the intended objects and achieves important advantages.

In fact, the presence of a knuckle-carrier assembly split into two bodies, one comprising the pin and the support for one of the arms, allows to make it easy to assemble and maintain the suspension.

Moreover, by integrating in one single body the steering pin and the lower support, in particular by "L" shaping such body, it is possible to offset the lower hinge point and the steering axis, making it possible to achieve a net reduction of the ground arm.

Furthermore, the shape of the knuckle-carrier assembly (i.e., of the second body of that assembly), with two unloading or contact points with the knuckle, allows for an optimum distribution of the loads, making it possible to realize a structure which is as robust as slender and compact.

The invention claimed is:

1. An independent suspension for a vehicle, comprising:
a steering knuckle extending between an outer portion, defining an axis of rotation of a hub of a wheel of the vehicle, and an inner portion comprising a receiving seat extending transversely to the outer portion along a steering axis;
a knuckle-carrier assembly rotatably coupled to the inner portion of the steering knuckle to allow a relative rotation around the steering axis, and comprising a first and a second supporting portion each defining a hinge point substantially horizontal to one end of a respective cross arm;
wherein the knuckle-carrier assembly comprises a first and a second body distinct from one another, in which:
the first body is substantially "L" shaped and has a linear portion, defining a steering pin, and an angled portion, defining the first supporting portion and extending transversely to the linear portion to misalign the respective hinge point by the steering axis;
the second body comprises a coupling portion fitted around the steering pin from which a supporting arm extends, comprising the second supporting portion and projecting laterally to the linear portion of the first body to misalign the respective hinge point from the steering axis.

2. The independent suspension according to claim 1, wherein the coupling portion of the second body of the knuckle-carrier assembly comprises a sleeve fitted around the steering pin and housed in the receiving seat of the steering knuckle.

3. The independent suspension according to claim 2, wherein the coupling portion of the second body of the knuckle-carrier assembly comprises an auxiliary support fitted around the steering pin at an end portion of the steering pin opposite to the first supporting portion of the first body; the auxiliary support being coaxial to and spaced from the sleeve to define a housing.

4. The independent suspension according to claim 3, wherein the inner portion of the steering knuckle comprises a fork body including two arms facing each other and spaced apart to define, between the two arms, the receiving seat, wherein the steering pin is inserted rotatably in the two arms of the fork body.

5. The independent suspension according to claim 4, wherein the two arms are a lower arm and an upper arm, wherein the first supporting portion of the first body protrudes externally to the receiving seat upwardly to the upper arm or below the lower arm.

6. The independent suspension according to claim 5, wherein the end portion of the steering pin protrudes externally to the receiving seat, on a side opposite to the first supporting portion.

7. The independent suspension according to claim 6, wherein the sleeve is interposed between the lower arm and the upper arm of the fork body.

8. The independent suspension according to claim 4, wherein one of the two arms is placed in the housing, wherein the steering pin is arranged astride the sleeve, the one of the two arms and the auxiliary support.

9. The independent suspension according to claim 1, wherein the inner portion of the steering knuckle and the second body of the knuckle-carrier assembly are at least partly "C" shaped opposite and mutually interpenetrating elements; the first body of the knuckle-carrier assembly being inserted in the "C" shaped elements with their protruding end portions.

10. The independent suspension according to claim 5, and further comprising a thrust bearing; wherein the second body comprises bearing area on the inner portion of the steering knuckle, in which the thrust bearing is operatively interposed between the second body of the knuckle-carrier assembly and the inner portion of the steering knuckle at the bearing area.

11. The independent suspension according to claim 10, wherein the thrust bearing is arranged around the steering pin, between the sleeve and the lower arm of the fork body.

12. The independent suspension according to claim 5, and further comprising a clamping nut coupled to an end portion of the steering pin opposite to the first supporting portion in order to lock the steering pin axially with respect to the steering knuckle.

13. The independent suspension according to claim 12, wherein the auxiliary support of the second body or the upper arm of the fork body have a housing slot for the end portion of the steering pin and for the clamping nut.

14. The independent suspension according to claim 13, wherein the housing slot comprises a through hole having a narrow portion facing the steering knuckle to receive the steering pin and an enlarged portion facing away from the steering knuckle and sized to receive and accommodate both the end portion of the steering pin and the clamping nut.

* * * * *